Figure 1:
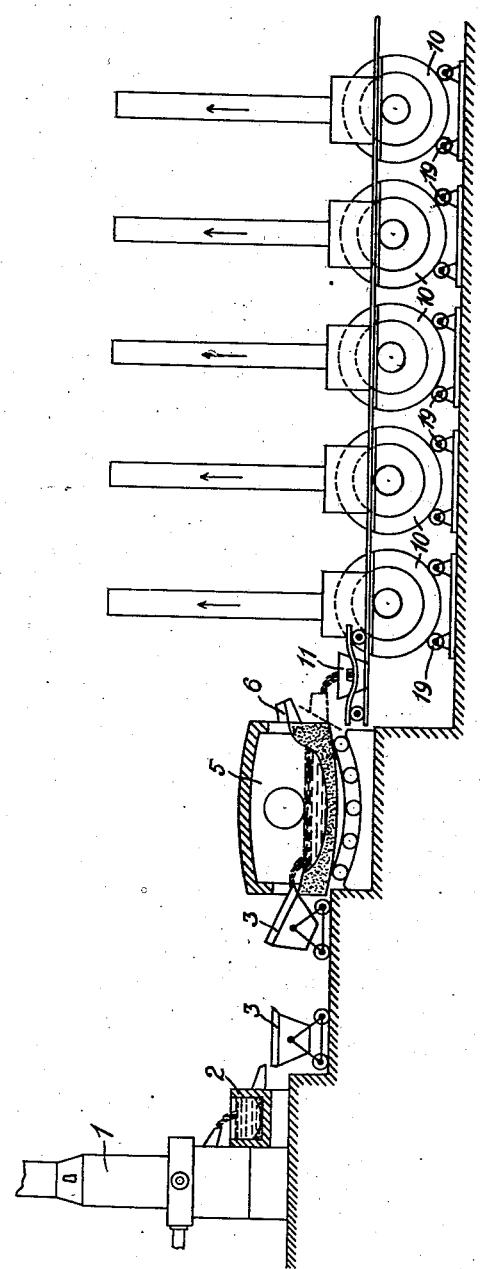

J. E. FLETCHER & J. HARRISON.
PUDDLING IRON.
APPLICATION FILED JULY 31, 1916.

1,220,081.

Patented Mar. 20, 1917.
2 SHEETS—SHEET 1.

Inventors.
J. E. Fletcher
J. Harrison

Attorney,

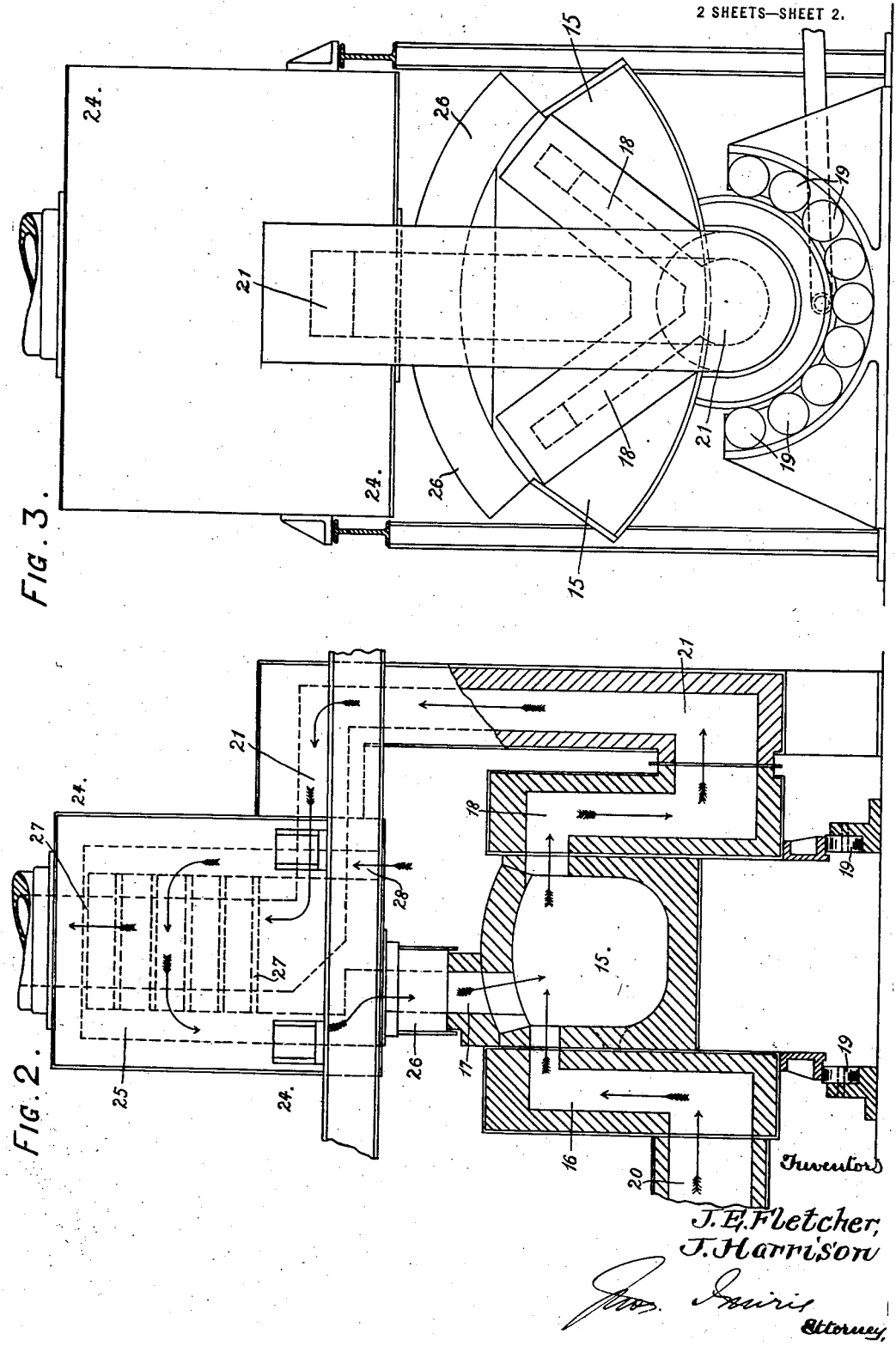

UNITED STATES PATENT OFFICE.

JOSEPH ERNST FLETCHER, OF DUDLEY, AND JAMES HARRISON, OF TIPTON, ENGLAND.

PUDDLING-IRON.

1,220,081.     Specification of Letters Patent.     Patented Mar. 20, 1917.

Application filed July 31, 1916. Serial No. 112,414.

*To all whom it may concern:*

Be it known that we, JOSEPH ERNST FLETCHER and JAMES HARRISON, subjects of the King of England, residing at Dudley, in the county of Worcester, United Kingdom of Great Britain, and Tipton, in the county of Stafford, United Kingdom of Great Britain, respectively, have invented Improvements in or Connected With Puddling-Irons, of which the following is a specification.

This invention has reference to continuous iron puddling or refining processes, and it relates more particularly to that type of process in which the refining and production of the puddled iron is effected in a plurality of stages, comprising a first stage in a cupola or glass furnace, a second stage in an intermediate refining furnace, and a final or third stage in a puddling or balling furnace or furnaces.

In processes of this kind, we have found that difficulties have occurred by which the continuous and regular successful working of the plant was rendered impossible; and the object of the invention is to provide improvements in connection with processes of this kind, or a generally improved process, by which the continuous and regular successful working shall be accomplished, and by which uniform results can be obtained.

According to this invention the manufacture of refined iron is carried out by collecting a quantity or storage of molten metal produced in a cupola or smelting furnace; removing from the molten metal the major portion of the slag containing such impurities as phosphorus, silicon and manganese after refining in an open hearth furnace having a basic or neutral lining; and then finishing the semi-refined metal by puddling such metal in batches in a plurality of puddling or balling furnaces.

The following description explains the whole process of manufacture of iron employed in carrying out the invention, and the apparatus or plant used in it.

In the plant used in carrying out the manufacture of iron under this invention, there is employed a metal melting or smelting furnace, such as a cupola or blast furnace; an intermediate open hearth refining furnace; and puddling or balling furnaces; and between the smelting or melting furnace, and the intermediate refining furnace, there is employed a receiver into which molten metal from the furnace is poured, of such a capacity as to hold a large body of molten metal; and this body of molten metal is introduced into the refining furnace, either directly through a runner or the like, or by means of movable ladles; and the partly refined metal is discharged from the refining furnace, and introduced into the puddling or balling furnaces.

In carrying out the process, there is provided an efficient storage of molten iron between the melting or smelting furnace, and the refining intermediate furnace, so that the supply of molten metal, and the rate of refining, synchronize; and this is obtained by the provision of a quantity of molten metal contained in the receiver.

In the intermediate furnace, which preferably is of the gas fired open hearth tilting type, the major portion of the impurities, phosphorus, silicon and manganese, are eliminated from the molten pig iron leaving the greater part of the carbon; and the slags produced by the treatment in this furnace and containing most of the impurities or detrimental elements, silicon, phosphorus and manganese, are separately tapped off by tilting the furnace, before the partially refined metal is run into the finishing furnace. Thus in the slags discharged most of these detrimental elements will be carried off; and by controlling the temperature in the intermediate furnace, and the addition of lime and iron oxids or fettling cinders to the molten metal charged into it, there is produced a metal containing about 1.5 to 3% of carbon, under .5% of silicon, under .3% of phosphorus, and under .3% of manganese.

The metal used in the intermediate furnace is manganiferous; *i. e.* it contains more than 1.0% of manganese, and preferably between 1.5% and 4%. Such manganiferous metal assists in keeping the slag liquid and quiet during the reactions in the intermediate furnace, and retards the oxidation or elimination of carbon in that furnace.

To insure the metal being manganiferous, manganese may be added to the metal in the intermediate furnace, and this addition of manganese to the metal charged into the intermediate furnace may be carried out by providing in the construction of such furnace a fore-hearth, on which manganiferous iron may be melted. This fore-hearth may be of such a capacity as to be adapted for melting down all the manganiferous pig iron necessary for the process, and will then serve the office of the receiver when molten pig iron from the cupola or blast furnace is used.

When required, the above mentioned fore-hearth can be the point of entrance for the ordinary molten pig iron from the cupola or blast furnace, the manganese being added as ferro-manganese alloys, or as high manganese pig iron, and melted in the fore-hearth.

The forehearth is an integral part of the intermediate refining furnace, and heated by the same fuel.

When desired the intermediate furnace can be entirely emptied of molten metal and slag at definite periods, the bed of the hearth repaired, the molten metal poured back again into the furnace, and the process continued.

When electric current can be cheaply supplied, the intermediate furnace may be heated by means of electric arcs, or by a combination of gas and electric arcs, the furnace being preferably of the tipping or tilting type, arranged, for tapping off the impure slags before pouring off the partially refined metal.

Because the molten metal supplied to and treated in the puddling or final balling furnaces is of the character described, or of the above analysis, and on account of the presence of liquid iron oxid slag or fettling cinder free of the impurities phosphorus, silicon, and manganese, and prepared in the puddling or balling furnace as hereinafter mentioned, the final refining action of the iron is accomplished in a relatively small time, and with relatively small loss through oxidation; thus rendering the process much superior to those formerly carried out in hand or mechanically operated puddling or balling furnaces.

The receiver into which the molten metal is run from the cupola or blast furnace, should be kept hot enough to prevent chilling of the iron.

It is only by using a high proportion of manganese in the refining furnace that the high carbon content can be retained in the refined metal; the slag being thereby kept in a highly basic and liquid condition. It is then possible to remove silicon and phosphorus from the crude iron charged, while retaining the desired high carbon percentage in the refined metal. This feature enables the refined metal to be kept liquid, while at the same time the phosphorus is nearly all eliminated.

The intermediate or refining furnace is lined with basic or neutral material (hereinafter termed non-acid material) and is preferably of the "tipping" type, as stated, so that the slags produced in it by the addition of lime and iron oxids, can be readily tapped and poured off; and the capacity of this intermediate furnace is such that a definite quantity of iron required per unit of time can be treated and poured for finishing in the final puddling or balling furnaces, of which there will be a plurality.

Thus if two tons of iron per hour are poured into the intermediate furnace from the receiver, then the capacity of this intermediate furnace must be such that two tons per hour of such metal can be so treated or refined, and that its chemical analysis may be brought to within the following limits:—

Carbon_____1.5 to 3 per cent., (preferably 2.5 to 3 per cent.)
Silicon_____Under .5 per cent.
Manganese_____Under .3 per cent.
Phosphorus_____Under .3 per cent.

The intermediate furnace is heated by gas, oil, or electric current, but the temperatures employed are medium—$i.\ e.$ less than those employed in steel melting furnaces, and are under complete control. Owing to the high manganese content the material remains freely fluid.

It is important that the carbon contents of the metal thus partially refined, should be brought to as nearly as possible $2\frac{1}{2}\%$ to $3\%$, so that the final treatment in the finishing or balling furnaces can be carried out in definite time, and without the losses which would otherwise occur through excessive oxidation.

The finishing or balling furnaces are preferably of the mechanically operated rocking or rotating type, and so adapted that the temperatures of the operation can be controlled or regulated; and in some cases, if desired, there is produced or employed in these furnaces a carbonizing atmosphere, so that the iron mass being treated may be finished in the condition desired, whether that condition be dead soft carbonless iron, or more or less toughened by the presence of carbon.

When the air used in the final furnaces for the combustion of the gas is to be heated, it is heated by the waste gases escaping to the chimney, by passing them through a continuous regenerator or recuperator of any known suitable type, through which the escaping gases led through some conduits, and the air is led over the surface of same on the opposite side to the heating gases. The finishing or balling furnaces may be of the ordinary coal or gas fuel hand operated type, but it is preferred that in the process worked as described gas or oil fired mechanically operated furnaces should be used as they are much more economical and satisfactory.

One of the balling or puddling furnaces may be used for the preparation of liquid oxidizing slag or cinder of such composition as is best suited to the physical and chemical requirements of the final refining processes, such slag being conveyed and poured into the balling furnaces before, at the time of, or after the admission thereto of the metal from the intermediate furnace. Or alternatively, the necessary oxidizing slag may be prepared and liquefied in each balling furnace immediately before receiving its charge of molten semi-refined metal from the intermediate furnace.

In a puddling plant as above described, the melting or smelting furnace should be capable of melting and delivering into the receiver at the rate of 3 tons per hour, the receiver being sufficiently large to hold say an hour's supply or say 3 tons.

Also in such a plant the intermediate furnace would have a capacity of at least 4 to 6 times that of the cupola receiver, or say a capacity of holding a metal charge of 12 to 18 tons; and the balling furnaces or puddling furnaces would each be capable of dealing with from 5 to 8 cwt., of metal at each charge, a sufficient number of such furnaces being employed to regularly use up or deal with the metal taken from the intermediate furnaces, each charge taking say about 30 minutes for its final finishing and balling. These puddling or balling furnaces are so designed and constructed, say with readily removable doors or the like, that the balls can be withdrawn with little labor, and so that they can be rapidly conveyed to the hammer, press, or squeezer, without waste of heat.

Drawings illustrating the invention are attached hereto, of which Figure 1 is a general view illustrating diagrammatically the process; while Fig. 2 is a section and Fig. 3 an end view of the finishing puddling or balling furnaces, which are of the "mechanical" type.

Referring now to the drawings, and more particularly Fig. 1, 1 represents the melting cupola; 2 is the receiver or covered portable ladle of a capacity such as specified, adapted to receive the charge of molten metal from the cupola; and 3 is a movable ladle into which the molten metal from the receiver is poured as and when required. The receiver is heated and kept hot in any suitable manner.

The intermediate refining furnace is marked 5, and is of the type known as the tilting gas fired type, and it receives the charges of molten metal from the ladle 3 at one side, and discharges the semi-refined molten liquid by a discharge part 6, from the other side.

The balling or puddling furnaces are marked 10, and the molten semi-refined metal from the furnace 5 (together with the molten iron oxid or fettling cinder as above described), free of the impurities phosphorus, silicon and manganese, is delivered to them by a traveling tilting ladle 11, in sequence, as required.

A definite quantity of iron can be treated in the furnace 5 per unit of time, and delivered from it, for finishing in the furnaces 10.

The operations constituting the complete process, and those performed in the apparatus are given above and therefore no further description is required of the manner of working the process and apparatus, nor the functions and effects produced in the different parts, and the results in the metal in itself.

With regard to the particular arrangement of the recuperative or regenerative puddling or balling furnace shown in Fig. 2, in which the finishing metallurgical operations or effects are performed, the metal treating and balling portion proper is designated 15, directly connected with which is its gas supply conduit 16, air supply 17, and burnt gas discharge conduit 18. These parts are all mounted on circular roller supports 19 and move together, the axis of oscillation being the centers of the entry of the gas conduit 16, (which receives gas from the conduit 20), and discharge part of the waste or burnt gas discharge conduit 18, which delivers into the stationary conduit 21.

The air entrance conduit 17 will be so arranged and work in connection with the hot air supply conduit 25 of the recuperator 24, that air continually passes into the furnace chamber 15; the conduit portion 17 of the furnace being quadrantal, and having as its center, the axis of oscillation of the furnace, and operating in connection with the corresponding quadrantal pendant arch 26, which is stationary.

The recuperator 24 is of the continuous tubular type, having tubes 27 over and outside of which the waste gases from the conduit 21 pass; while air entering and flowing by the passage 28, passes through the tubes 27, and thence into the hot air conduit 25, and so into the furnace chamber 15.

What is claimed is:—

1. In the refining and puddling of iron, the process which comprises delivering to a basic-lined open-hearth furnace, freely fluid molten pig iron, containing a sufficient percentage of manganese to keep down the oxidation of carbon, then oxidizing the major portion of the phosphorus and silicon and some of the manganese but without removing any great amount of the carbon, separating the slag containing the compounds of phosphorus, silicon and manganese, while leaving a freely fluid iron high in carbon and thereafter puddling the so refined molten metal.

2. In the manufacture of wrought iron, the herein described process which comprises (a) maintaining a considerable batch of molten pig iron, (b) withdrawing freely fluid portions from said batch substantially free from slag, and refining the same in an open hearth non-acid lined furnace sufficiently to bring the same while containing a high percentage of manganese to within the following limits:—

| | |
|---|---|
| Carbon | About 2.5 to 3 % |
| Silicon | 0 to .5% |
| Manganese | 0 to .5% |
| Phosphorus | 0 to .3% | and removing the slag therefrom, (c) separating the so refined freely fluid metal into smaller batches and puddling the same.

In testimony whereof we have signed our names to this specification in the presence of two subscribing witnesses.

JOSEPH ERNST FLETCHER.
JAMES HARRISON.

Witnesses:
SYDNEY G. DAVIES,
WM. WRIGHT.